Patented Oct. 25, 1932

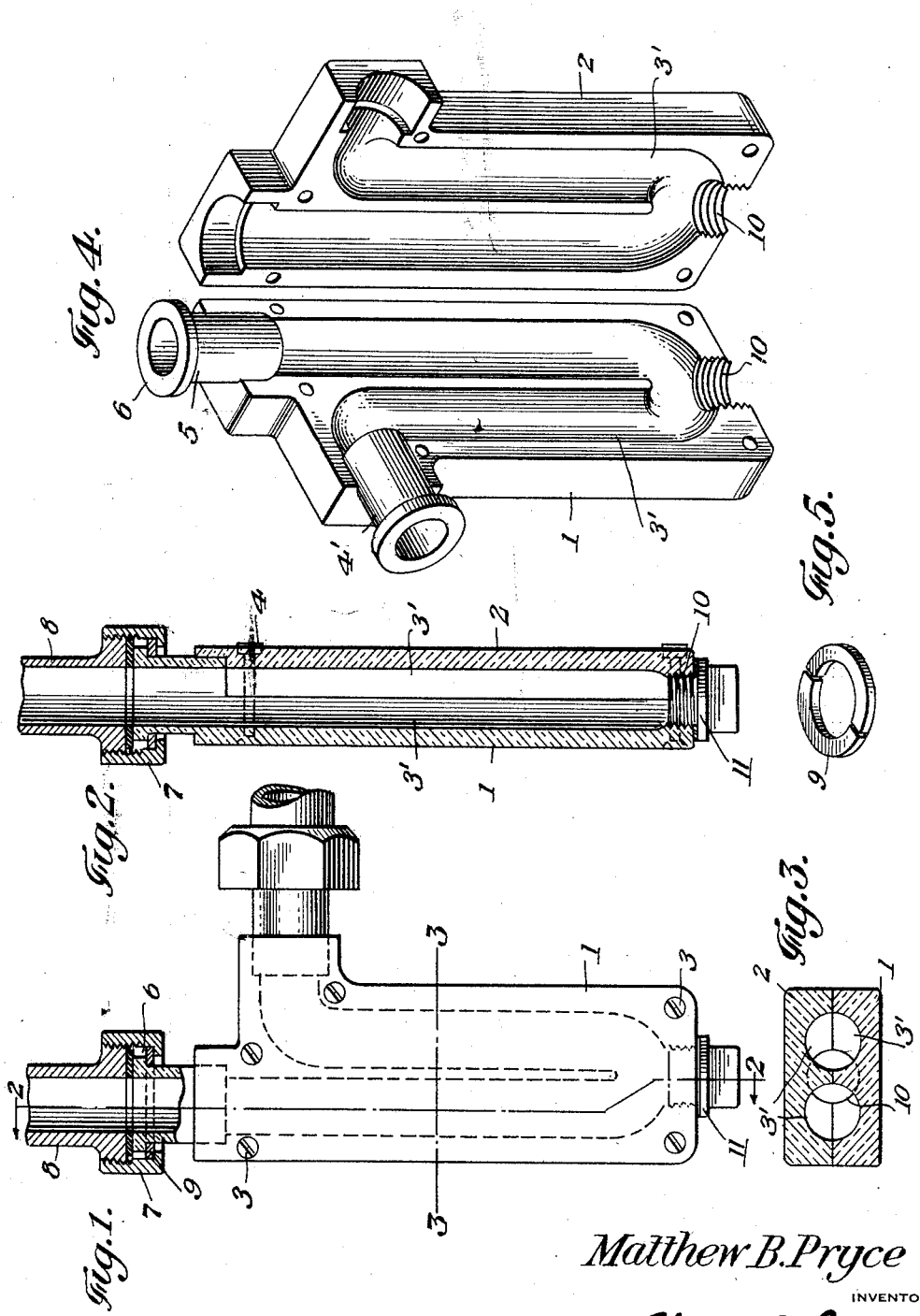

1,884,855

UNITED STATES PATENT OFFICE

MATTHEW BYRNE PRYCE, OF ROCK HILL, SOUTH CAROLINA

TRANSPARENT TRAP

Application filed September 21, 1931. Serial No. 564,244.

This invention relates to a transparent trap especially adapted to be used in connection with sinks, basins and toilet bowls and it consists in the novel features hereinafter described and claimed.

As is the general practice at the present time, traps are formed of bent metal tubes and although they present neat external appearance there is no means for conveniently detecting the internal condition which exists unless the inspection vent is opened, or the trap becomes so clogged that the sewerage backs up in the basin, sink or toilet, as the case may be. When this condition prevails there is constantly a discharge of foul gas emitted from the putrefying matter adhering to the sides of the trap on the side immediately attached to the outlet of the basin sink or toilet and which although very injurious to health is not noticeable until it becomes so offensive as to be intolerable.

The object of the present invention is to provide a trap structure which will permit of internal inspection at all times. The body of the trap is formed by two flat sections of glass or other transparent material which are provided with ground surfaces to fit together closely enough to form a thorough air, gas and water tight joint. These sections are provided with juxtaposed grooves which form a pipe or passageway. Sufficient space is provided to perform a complete liquid seal and the texture of the material is such as not to interfere with the proper siphonage of the trap. The trap can be cast in glass of a quality which will resist heat and cold and inasmuch as glass is a non-conductor, additional safeguard of the efficiency of the trap is assured as against freezing where exposed to low temperatures.

A vent is provided at the base of the trap which will enable the same to be cleaned at frequent intervals but the construction of the trap is such that by unscrewing small bolts, one-half of the complete trap may be removed and the entire interior surfaces are laid open and can be thoroughly cleansed. After cleaning, the parts may be reassembled without disconnecting the pipes.

In the accompanying drawing:

Figure 1 is a side elevational view of the trap with parts broken away and parts in section.

Figure 2 is a transverse sectional view cut on the line 2—2 of Figure 1.

Figure 3 is a horizontal sectional view of the trap cut on the line 3—3 of Figure 1.

Figure 4 is a perspective view of the trap showing the sections thereof separated.

Figure 5 is a perspective view of a washer that may be used in the trap.

As illustrated in the accompanying drawing, the trap consists of sections 1 and 2, preferably of glass. These sections are secured together by means of bolts 3 which pass transversely through the same and are secured by means of nuts 4 in a usual manner. The sections 1 and 2 are provided with grooves 3' which oppose each other when the sections are connected together and form a pipe or passageway. The grooves are curved at points between their ends and one end of the grooves leads out through the side edges of the sections and the other end of the grooves leads in from the top ends of the sections. Pipe connecting nipples 4 and 5 are provided at the ends of the grooves and said nipples in turn are provided with flanges 6 adapted to coact with the flanges of union nuts 7 for connecting the nipples with pipes 8 in a usual manner. Washers 9 may be interposed between the flanges 6 and the ends of the pipes 8 and also between the flanges 6 and the flanges of the union nuts 7 as indicated in Figures 1 and 2 of the drawing and in a usual manner. Threaded vent grooves 10 are provided at the bends of the grooves 3 and at the lower end of the body of the trap and said grooves when juxtaposed form a cleansing opening. The said opening is normally closed by a plug 11.

From the foregoing description taken in conjunction with the accompanying drawing, it is apparent that a trap is provided through the sides of which the condition of the interior thereof may be ascertained at a glance. Should the trap become fouled, the plug 11 may be removed and the trap may be cleaned in a usual way or in the event that the material clogging the trap is adhering tightly to the walls of the grooves, the sections may be separated as indicated in Figure 4 of the drawing and the grooves may be thoroughly cleaned, after which the sections are reassembled and the trap may function properly for the purposes intended.

Having described the invention what is claimed is:

A trap consisting of a transparent rectangular body formed with parallel cross-sectionally circular ducts separated by a relatively thick wall and opening at one end of the body, the ducts being in communication with each other at their other ends, said body being tapped at the open ends of said ducts for connection with inlet and discharge pipes and being split in a plane common to the diameters of both ducts to provide complemental sections for separation and removal without change in the normal positions of the connecting pipes, and removable fasteners securing said sections together.

In testimony whereof I affix my signature.

MATTHEW BYRNE PRYCE.